United States Patent [19]

Mann et al.

[11] Patent Number: 4,724,035

[45] Date of Patent: Feb. 9, 1988

[54] APPARATUS FOR APPLYING BASE CUPS TO BOTTLES

[75] Inventors: John M. Mann, Downers Grove; Michael M. Shulski, Northfield, both of Ill.

[73] Assignee: American National Can Company, Chicago, Ill.

[21] Appl. No.: 24,250

[22] Filed: Mar. 10, 1987

Related U.S. Application Data

[63] Continuation of Ser. No. 717,786, Mar. 29, 1985.

[51] Int. Cl.⁴ .................. B29C 65/52; B29C 65/80
[52] U.S. Cl. .................. 156/423; 156/497; 156/567; 156/578; 406/86
[58] Field of Search .......... 156/423, 294, 567, 285, 156/539, 556, 497, 578; 29/DIG. 78, DIG. 63; 406/86, 88

[56] References Cited

U.S. PATENT DOCUMENTS

| | | | |
|---|---|---|---|
| 4,132,584 | 1/1979 | Aidlin | 156/500 |
| 4,284,370 | 8/1981 | Danler | 406/86 |
| 4,300,966 | 11/1981 | Hoffman | 156/423 |
| 4,365,915 | 12/1982 | Neumann | 406/88 |
| 4,384,907 | 5/1983 | Aidlin | 156/567 |
| 4,441,955 | 4/1984 | Richardson | 156/423 |

FOREIGN PATENT DOCUMENTS 2916822  4/1979  Fed. Rep. of Germany ...... 156/567

*Primary Examiner*—Donald E. Czaja
*Assistant Examiner*—J. Davis
*Attorney, Agent, or Firm*—Robert A. Stenzel; Ralph R. Rath

[57] ABSTRACT

Apparatus for assembling base cups onto bottles includes an assembly wheel that has a plurality of pockets on the periphery thereof and a plurality of fluid cylinders supported on an upper support plate and aligned with the pockets. The assembly wheel is positively driven by a drive motor, which also drives a bottle-infeed mechanism and a cup-infeed mechanism, as well as an ejector mechanism. The cup-infeed mechanism includes as indexable carrier that indexes each cup at a glue-applying station, where the cup is raised and simultaneously rotated while glue is being applied in an annular pattern to the inner surface of the cup. The cup and bottle have movement along paths which merge where the bottle is then forced into the cup through a pressurized source and held in that position while the glue sets.

24 Claims, 7 Drawing Figures

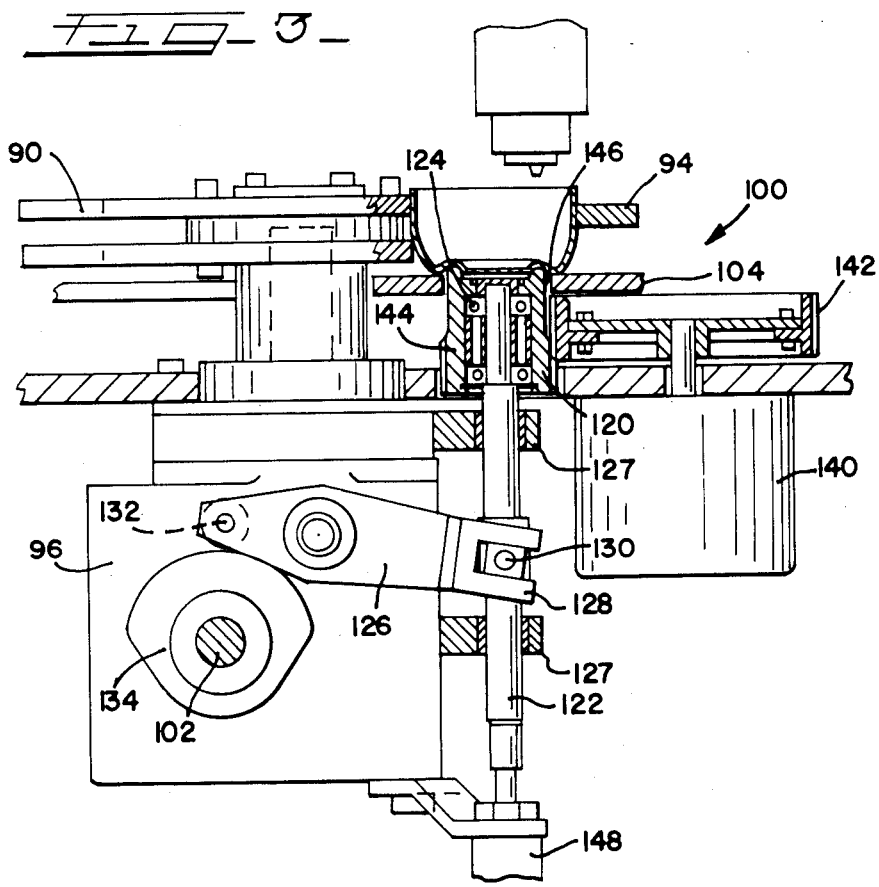
FIG-3-
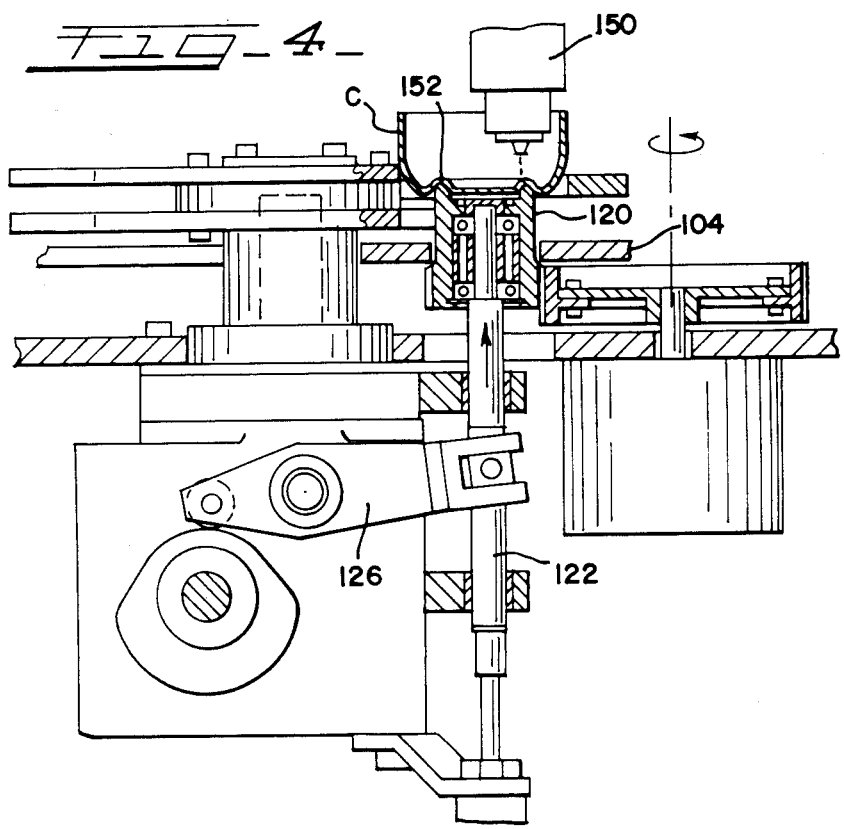
FIG-4-

APPARATUS FOR APPLYING BASE CUPS TO BOTTLES

This application is a continuation of application Ser. No. 717,786, filed 3-29-85.

DESCRIPTION

1. Technical Field

The present invention relates generally to commercial machines for producing beverage containers and, more specifically, to machines for assembling base cups to bottles having rounded bottoms.

2. Background Prior Art

Bottles and cans have been the primary source of packaging beer and soft drinks for many decades. One type of bottle that has been marketed successfully and has received favorable acceptance is the two-liter plastic bottle with a resealable closure. This package is made of a blow-molded PET and has a rounded or semi-spherical bottom and a threaded neck which has a neck ring. A base cup is secured to the bottom of the unit to provide stability for the package during storage, shipment and use.

Examples of prior art machinery for applying base cups are disclosed in U.S. Pat. Nos. 4,132,584 (Aidlin) and 4,300,966 (Hoffman). The patent to Aidlin discloses a transport turret that has a plurality of stations on the periphery thereof to which base cups are supplied from a conveyor while separately-formed plastic bottles are supplied from another conveyor. Glue is applied to the base cups and bottles and base cups are clamped to allow the glue to partially set and interconnect the elements, after which the units are ejected. The Aidlin machines have the turret driven intermittently through a drive motor and gear and chain arrangements.

The Hoffman patent discloses a similar machine wherein base cups are fed to a turret which has a plurality of pockets and is indexed at an adhesive-applying station and a bottle-insertion station. Pressurized air is used to clamp the bottle and cup until the adhesive sets.

Advertising literature and machinery specifications profess speeds of 100 and 80 ppm, respectively for the machines, but actual use of such equipment by the Assignee of the present invention has shown that it is difficult to maintain such production speeds for extended periods of time. Furthermore, it was determined that the drive system requires substantial maintenance and results in considerable down-time regularly.

Thus, there remains a need for a base cup applying machine that has greater production speeds and less maintenance than existing equipment, and at the same time produces a higher percentage of acceptable units and minimum scrap.

Summary of the Invention

The disadvantages of the prior art are overcome and the needs of the industry are met by the machine according to our invention which comprises an endless assembly means adapted to move continuously in operation along a first path of travel, a base cup means supply for feeding base cup means along a second path of travel to positively feed said base cup means to said assembly means at a first transfer station along said first path of travel, a container means infeed supply along a third path of travel intersecting said first path of travel at a second transfer point whereby container means are positively fed onto said continuously moving assembly means. The first transfer station moves intermittently to feed a base cup means from said second path to said transport means and has sensor means operable to feed a mating container means to said assembly means only in response to the presence of a base cup means in the first transfer station. The assembly means includes an assembly device for bringing said container means and base cup means together for a required period of time to form a unit and discharge means for removing assembled units from said transport means at a third transfer station under positive control. The advantages of higher speeds, less maintenance and less scrap are achieved inter alia by maintaining positive control of base cups and bottles throughout the assembly cycle so that there is a synchronized relation between the base cup and a bottle at all times and the base cup and bottle are positively held at all times to minimize any possible misalignment between the two during the assembly cycle.

More specifically, the machine includes an article handling means which may be a rotatable turret or assembly wheel driven by a drive motor with a base cup-infeed means driven by the same drive motor, and means for feeding bottles from a supply source to the article handling means. Both the cup and the bottle-infeed means may include pneumatic conveyors.

The base cup-infeeding means comprises a carrier or starwheel which has a plurality of peripheral pockets and is rotated and indexed through an indexing gear arrangement driven by the common motor drive for the entire system. A glue-applying station is located in radial alignment with the pockets and includes an annular cup holder or sleeve which is axially reciprocable and continuously rotated to lift and rotate the cup while glue is being applied from a source above the cup.

The annular holder or carrier is freely rotatable on an upper end of a hollow shaft guided for movement on the base. A crank is pivoted on the base and has one end connected to the shaft with a cam follower on the opposite end engaging a cam driven by the common drive motor. The annular holder may be continuously rotated by a separate drive motor.

A transfer wheel is rotated on the base by the common drive and positively transfers the cup with the applied glue from the carrier to the assembly wheel and positioned under the bottle, which is positively located in the assembly wheel by a pocket and a guide system.

BRIEF DESCRIPTION OF SEVERAL VIEWS OF DRAWINGS

FIG. 1A is a schematic elevational illustration of the assembly wheel;

FIG. 3 is a cross-sectional view of the glue-applying station as viewed along line 3—3 of FIG. 1;

FIG. 4 is a view similar to FIG. 3 showing the cup in the raised position and glue being applied;

FIG. 5 is a fragmentary side elevation of a part of bottle conveyor system; and, FIG. 6 is an end view of the bottle conveyor system.

DETAILED DESCRIPTION

Figure 1:
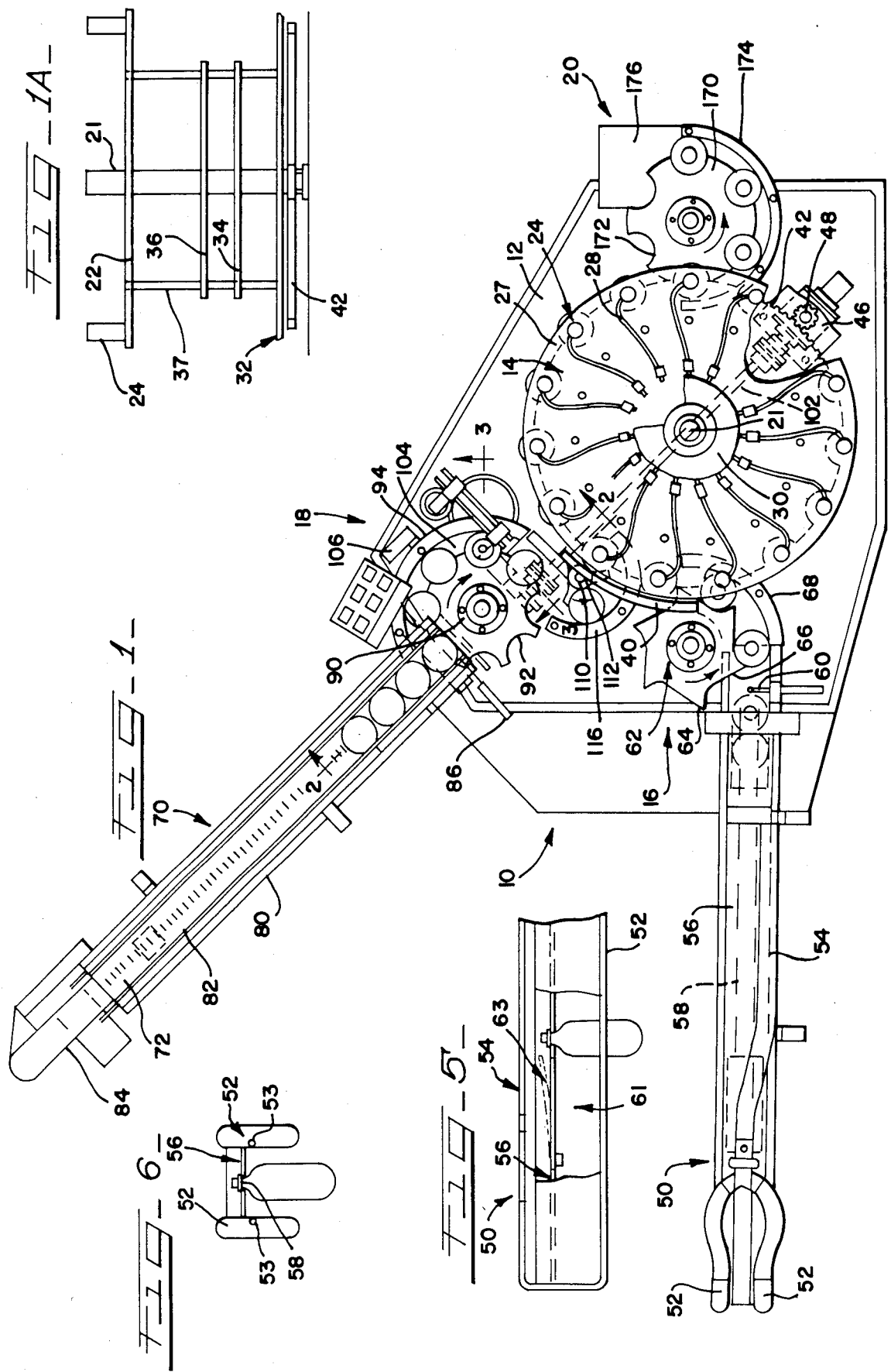
FIG. 1 is a plan view of the base cup applicator machine.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings shows the machine, generally designated by reference numeral 10, including a base 12 that has a turret 14 rotatable thereon, along with a bottle-feeding station 16, a cup-feeding station 18, and a removal or discharge station 20.

Turret or assembly wheel 14 includes an upper support plate 22 which supports a plurality of cylinders 24 around the periphery thereof. Each of the cylinders 24 has a hollow piston rod 26 (FIG. 2) reciprocated therein. Piston rod 26 is spring-biased to a return position and is extended through fluid pressure applied from a source (not shown) through conduits 28 and a rotary valve arrangement 30.

Figure 2:
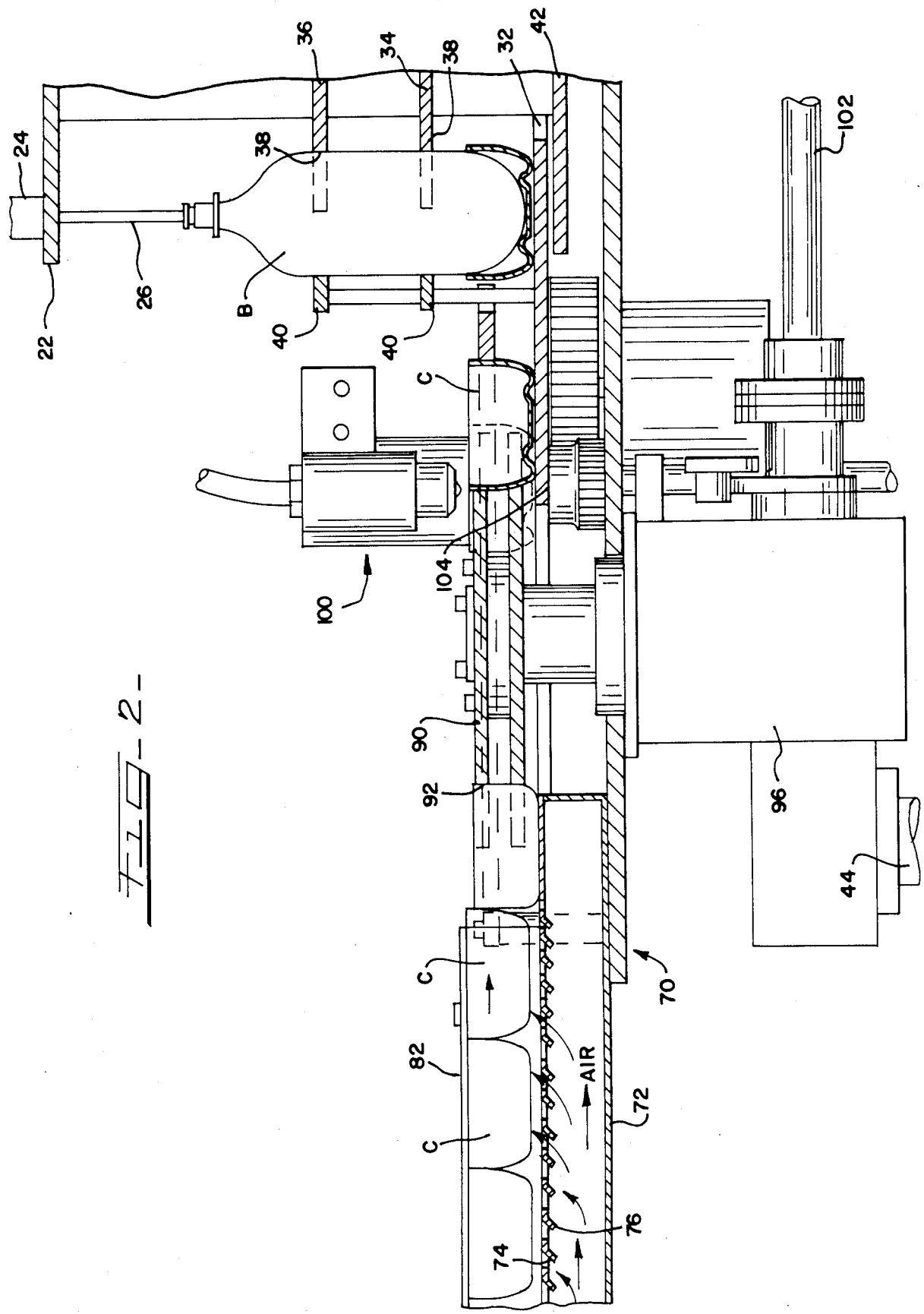
FIG. 2 is a cross-sectional view of the cup-infeed mechanism as viewed along line 2—2 of FIG. 1.

Turret or assembly wheel 14 also may have a lower flat plate 32 and a pair of intermediate plates 34 and 36 interconnected by posts 37, with plates 34 and 36 having a plurality of recesses 38, which define pockets for the bottle, as illustrated in FIG. 2. Three guide rails 40, two of which are aligned with plates 34 and 36 define an outer guide surface so that the bottle will be positioned in the pockets 38 by friction, as will be described later. The rotating turret or endless assembly means consists of upper support plate 22, lower flat plate 32, intermediate plates 34 and 36 and gear 42 and rotates about fixed center shaft 21.

The large drive gear 42, fixed to lower flat plate 32, is driven by a motor 44 through index box 96, drive shaft 102, gear box 46 and small drive gear 48, so that the assembly wheel is continuously and positively rotated when motor 44 is energized.

Bottles B are fed from a source along a path defined by a pneumatic conveyor 50 to the bottle-infeed station 16. The pneumatic conveyor 50 consists of a pair of spaced conduits 52 having inwardly-directed openings 53 and connected to a source of pressurized air through a hose 54. Pneumatic conveyor 50 also includes an upper guide plate 56 having an elongated slot 58 which receives the reduced neck portion of the bottle (see FIG. 6) so that the bottle neck fill ring rides on plates 56 and is moved along the path by the pressurized air exiting through the openings in the pair of conduits 52. A retractable stop member 60 may be interposed at the end of the path to hold the array of bottles and control the movement into the infeed station 16.

Connected to guide plate 56 and positioned after the open end of guide slot 58, but before retractable stop member 60 (see FIG. 5), is alternate bottle feed gate 61, which comprises spring means 63 having an upper surface normally aligned with the upper surface of guide plate 56 and connected at one end to guide plate 56 such that slight upward force from a bottle will deflect spring member 63 upwardly and allow the bottle neck ring to be inserted into guide slot 58. After the bottle has passed by, the spring means 63 returns to its normal closed position. This spring means 63 provides an intermediate alternate bottle supply port in the bottle-infeed supply so that bottles may be inserted without interrupting normal bottle supply. Also, in the event of an interruption of supply from the normal machine supply, bottles may be inserted at this point to keep the base cup applying apparatus supplied. It is also handy when inspected bottles are to be returned to the supply line.

The bottle-infeed station 16 comprises a starwheel 62 that has fingers 64 defining pockets 66 for the respective bottles. A pair of arcuate guide rails 68 extend around a portion of the starwheel 62 and between plates 34, 36. Starwheel 62 is driven through a gear (not shown) in mesh with the large drive gear 42.

Thus, the continuously-rotating starwheel 62 picks up respective bottles B adjacent the outer end of arcuate guide rail 68, whereupon the bottles are under positive control at all times as they are transferred through bottle-feeding station 16 and into the assembly wheel 14. The bottles are gripped in a like manner between pocket 38 and the arcuate guide rail 40.

Base cups are supplied from a source along a first path through a pneumatic conveyor 70, illustrated in detail in FIG. 2. The pneumatic conveyor 70 comprises a rectangular conduit 72 having a plurality of openings 74 created by deflecting tabs 76 from the body of the metal forming the conduit. Side guide rails 80 and top bars or guide bars 82 (FIG. 1) define a partially-enclosed space for the base cups C and direct them along a path towards the base cup-infeed station 18. A blower 84 is connected to the end of conduit 72 so that pressurized air will lift the cups C above the surface of the conduit 72 and move them along a path, indicated by the arrow in FIG. 2, towards the cup-infeed station 18. A retractable gate 86 at the end of conveyor 70 prevents cups from entering carrier 90 until the appropriate time.

The cup-infeed station 18 includes a generally circular carrier 90 that has a plurality of pockets 92 formed on the periphery thereof. Each of the pockets is configured substantially the same as the periphery of the cups so that the cups are placed in full engagement in the pockets by the pressurized pneumatic fluid in conduit 72.

An arcuate guide bar 94 extends partially around the periphery of the carrier 90, as shown in FIG. 1, so that the cups are under positive control during the indexing of the carrier 90.

The carrier 90 is driven by an indexing gear box 96 to index the pockets to a glue-applying station 100, which will be described in further detail later. The indexing gear box 96 is driven by motor 44.

A dead plate 104 extends from the end of the conveyor 70 around the periphery of the carrier 90 to the assembly wheel and defines a support surface for the cups C as they are being indexed to various locations around the periphery of the carrier 90. A sensor mechanism 106 may be positioned adjacent the periphery of the carrier 90 to sense the presence or absence of a cup in each of the pockets as the associated pocket is aligned with the sensor to assure glue application only when a cup is located in the proper place at the proper time, as will be explained later.

The cup-infeed station also includes a transfer wheel 110 supported on a shaft 112 mounted to the base 12 and transfer wheel 110 consists of a plurality of radially-extending fingers. Shaft 112 is positively driven through a gear (not shown) that is in mesh with the main drive gear 42 so that the continuously-rotating transfer wheel 110 will engage the cups while in the pockets 92 and drive the base cups below a respective bottle B. This movement is again controlled by an arcuate guide rail 116 that extends from the edge of the carrier 90 and into the periphery of the assembly wheel.

The details of the glue-applying station 100 are illustrated in FIGS. 3 and 4 and include an annular holder or carrier 120 that is supported on the upper end of a reciprocable shaft 122 with suitable bearings 124 interposed between the carrier and the shaft. The shaft 122 is supported on guide bars 127 and reciprocated vertically through a crank 126 that has a clevis arrangement 128 on one end thereof, which extends on opposite sides of the shaft 122 and receives a slide block 130 fixed to the shaft 122. The opposite end of crank 126 has a cam follower 132 rotatable thereon, which is in continuous engagement with a cam 134 that is fixed to shaft 102 and the output shaft of index box 96. The cam 134 is configured such that the shaft and annular holder 120 are in the raised position, illustrated in FIG. 3, for approximately one-half revolution of shaft 102, as shown in FIG. 4, and in a lowered position for approximately one-half revolution.

Annular holder or carrier 120 may be continuously rotated through a small drive motor 140 having a gear 142 on its output shaft, which is constantly in mesh with a gear 144 defined on the periphery of annular holder or carrier 120. Annular holder 120 is aligned with an opening 146 in dead plate 104 so that as the carrier is raised, it will engage the lower surface of the cup and raise the cup above the dead plate 104 and simultaneously rotate the cup through motor 140. Preferably, the cup is held onto the carrier through a vacuum source 148 that is in communication with the space adjacent the upper end of the carrier through the shaft 122, which is hollow.

While the carrier is in the raised position and is being rotated to rotate the cup, glue is applied to the interior of the cup from a glue-applying mechanism 150, as shown in FIG. 4. The glue-applying mechanism 150 may, for example, be of the type manufactured by Nordson Corp., Schaumburg, Ill., as Model 18, with a Nordson Model H20A gun and a single orifice nozzle controlled by a Nordson Model CT-6 time interval control. Glue may be holt melt, cold setting or other means known in the art.

Usually, the base cups C may be configured to have an annular raised portion or ridge 152 that defines a support point for positively supporting the container in the holder. As illustrated in FIG. 4, the glue applicator 150 is aligned with the upper surface of this annular ridge 152 so that glue is being applied to the entire surface while the cup is being rotated. Alternately, the glue may be applied in dots. In another alternative, the drive motor 140 and gear 142 may be disabled and glue applicator 150 aligned with the center of vertical shaft 122. In this configuration, a dot-type glue pattern may be applied.

The operation of the mechanism is believed to be apparent from the above description, but will be briefly summarized at this point. Plastic bottles are fed from a source into the open end of guide slot 58 and are moved along the guide slot 58 by the pressurized air within conduits 52 so that the bottles are moved along a path to the end of the conveyor where the movement is interrupted by retractable stop 60. At the same time, cups are delivered from a source (not shown) onto the upper surface of the conduit 72, and the pressurized air lifts the cups off the surface of the conduit and moves them along the path defined by the guide rails 80 and 82 to the end of the conveyor, where movement is interrupted by gate 86.

At an appropriate time, and provided both a cup and matching bottle are available, the lead cup is released by retracting the stop 86, and the cup moves into engagement with the now-stationary pocket 92 on the indexing starwheel 90. The indexing of starwheel 90 will remove the cup from the end of the path defined by the conveyor 70 onto dead plate 104 and subsequent indexes will move it first in front of the sensor mechanism 106 and next to glue station 100. During this movement, the cups are under positive control, being frictionally gripped between pockets 92 and the arcuate guide rail 94. When a cup stops in front of sensor mechanism 106, bottle stop 60 retracts and the bottle moves into engagement with the leading edge of the pocket 66 on the continuously-rotating starwheel 64. The starwheel 64 and guide 68 are configured and positioned such that the bottle is under positive guidance or control in that the guide rail 68 holds the bottle in engagement with the starwheel 64 as the starwheel rotates and moves the bottle toward the assembly wheel 14.

The moving bottle B and the respective moving pockets 38 are aligned with each other so that the bottle engages the surfaces defining the recesses 38 as it enters the area inside the leading edge of guide bar 40. When the bottle is in full engagement with the arcuate surfaces 38, the bottle is frictionally gripped between the guide bars 40 and the plates 34 and 36, as it is being moved by the assembly wheel 14.

Cups are delivered in a single line along a first path to the glue-applying station 100, where, in this embodiment, the cups are lifted and simultaneously rotated while glue is applied to the ridge 152. Thereafter, the cups are lowered onto the dead plate 104 and indexed towards transfer wheel 110, which picks up the respective cups and moves them along the dead plate 104 onto base plate 32 horizontally aligned with dead plate 104 and in direct alignment below the bottles in the respective pockets 38, again being under positive control through the guide rail 116. Once the cup is positioned below the bottle B, the hollow piston rod 26 is extended by pressurized air in cylinder 24 and forces the bottle down into the base cup into engagement with the ridge 152 where glue was applied. The assembled bottles and base cup remain under clamping pressure until just prior to the discharge station 20, where pressure is removed from clamping cylinder 24.

The discharge station or removal means 20 again includes a rotatable carrier 170 that has a plurality of pockets 172 on the periphery thereof and is again continuously driven through a gear (not shown) in mesh with main drive gear 42 so that the assembled base cup and bottle are positively removed and are guided along guide bar 174 and exit through a chute arrangement 176.

By means of microprocessor controls in conjunction with sensors such as shown for example at 106, the supply of base cups C may be keyed to the presence of a container B whereby if the container B should be absent from its normal place in the transport means, the base cup glue application and transfer infeed means will pause and wait for the next container to come along. This intermittent movement of the base cup means infeed in combination with the continuous movement of the transport means has been found to produce advantageous results such as minimizing scrap.

Thus, it will be seen that the present invention provides a positive control and precise transfer of the cups and the bottles at all times throughout the cycle of assembly and the synchronized drive means such as the direct gear engaging drive for all of the mechanisms from a single drive motor allows for accurate synchronized control movement of the cup and the bottle throughout the assembly cycle. Since the bottle and cup are positively controlled between a stationary guide rail and a movable support member, there is no possibility of misalignment that may result in jamming of parts, which jamming would result in destruction of the product and severe extra wear and tear on the apparatus. In fact, the positive control and synchronized movement has significantly reduced, in the order to two-thirds in our experience, the normally resulting scrap material in the production of these types of bottles and at the same time has significantly reduced the maintenance required. Another result has been the higher operating speeds permitted with our arrangement. For example, we have achieved the full production speed of 120 2-liter units per minute and believe a speed of 150 2-liter units per minute would be readily achievable with relatively minor modifications. We believe that with smaller half-liter containers, even greater speeds would be possible according to the principles of our invention. This increase in speed permits one base cup applicator to readily handle with a safe cushion the full production of one high speed blow-molding machine such as for example an RHB-V machine and minimizes space and track work requirements.

In addition to the preferred embodiment described by way of example, it will be understood by those skilled in the art that the principles of our invention may be applied to other machines. For example, in lieu of the glue application, an adhesive tape may be applied at any point, or glue may be applied around the upper edge of the cup. Also, the cup need not be rotated or raised. Further operations in addition to or in lieu of the glue applying operation may be included as for example printing or labeling. Moreover, the transport means may be an endless means instead of a rotating table. Additional stages for labeling may be added as for example, wrap-around or sleeve labeling and may further include heat-shrink means for the labels and base cups.

From the foregoing it will be apparent that our invention as defined in the following claims provides a highly dependable, reliable and efficient base cup application means that overcomes the disadvantages of the prior art and meets the demanding commercial needs of the industry.

We claim:

1. An apparatus for assembling base cup means with container means comprising an endless assembly means adapted to move continuously in operation along a first path of travel; base cup supply means for feeding base cup means along a second path of travel to said assembly means; intermittently-operated transfer means for receiving base cup emans from said second path and including an adhesive applicator means for applying adhesive to said base cup means and a continuously rotating wheel means for receiving base cup means from said transfer means for delivery to said assembly means; a container supply means along a third path of travel intersecting said first path of travel and having second transfer means whereby container means are positively fed onto said continuously moving assembly means, said intermittently-operated transfer means having sensor means cooperating with said container supply means to supply a container means to said second transfer means only in response to the presence of a mating base cup means in said intermittently-operated transfer means, said assembly means including an assembly device for bringing said container means and base cup means together for a required period of time to form a unit; and discharge means for removing assembled units from said assembly means at a third transfer station.

2. Apparatus as defined in claim 1, in which said wheel means and said second transfer means include continuously-rotating starwheels driven by a common power source.

3. Apparatus as defined in claim 1, in which said container supply means includes pneumatic conveying means having plate means defining a slot with said container means suspended on said plate means, said plate means having an interrupted portion with a deflectable member covering said interrupted portion so that container means can be manually inserted into said slot.

4. Apparatus as defined in claim 2, in which said endless assembly means includes a turret rotatable about a fixed axis and having a plurality of assembly stations on a periphery thereof, each having a clamping means for holding said container means and said base cup means together for said required period of time.

5. Apparatus as defined in claim 4, in which said common power source drives said turret and said starwheels in synchronized relation to each other.

6. Apparatus as defined in claim 1, further including stop means along said third part of travel for interrupting movement of said container means and said sensor means cooperating with said intermittently-operated transfer means to activate said stop means in response to the presence of a base cup means so that base cup means and container means are synchronizingly delivered to said assembly means.

7. Apparatus as defined in claim 1, in which said base cup supply means includes pneumatic conveyor means and guide rail means associated therewith for moving said base cup means along said second path.

8. Apparatus for assembling base cup means with container means comprising an endless assembly means adapted to move continuously in operation along a first path of travel, base cup supply means for feeding base cup means along a second path to a first transfer means for continuous delivery to said first path, said first transfer means including adhesive applicator means for applying adhesive to said base cup means, container-infeed supply means for feeding container means along a third path of travel intersecting said first path of travel, said container-infeed supply means including plate means defining an elongated support slot for receiving a portion of said container means to suspend said container means on said plate means, pressurized fluid means for moving said container means along said plate means, said plate means being interrupted along a portion of said slot to define a gap with a deflectable member extending across said gap so that container means can be manually inserted by deflecting said member.

9. Apparatus as defined in claim 8, in which said first transfer means includes an intermittently-operated transfer device with said adhesive applicator means cooperating with said transfer device and a continuously-operated transfer means for receiving said base cup means from said intermittently-operated transfer device for delivery to said assembly means.

10. Apparatus as defined in claim 8, in which said container-infeed supply means includes retractable stop means along said third path of travel and continuously-operable transfer means for receiving container means from said third path for delivery to said assembly means.

11. Apparatus as defined in claim 10, in which said continuously-operable transfer means includes a rotatable starwheel and rail means surrounding said starwheel so that said container means are positively gripped while being moved to said assembly means.

12. Apparatus as defined in claim 9, further including guide means surrounding said transfer device and said continuously-operable transfer means so that said base cup means are frictionally gripped during movement to said assembly device.

13. Apparatus for assembling base cups onto bottles; comprising an assembly wheel having a plurality of bottle-receiving pockets thereon and clamping means associated with each pocket, drive means for continuously moving said assembly wheel; first conveyor means for delivering a continuous supply of bottles along a first path toward said assembly wheel; first transfer means at the end of said first path driven in synchronization with said assembly wheel and including a fixed guide rail means surrounding said first transfer means and a rotatable transfer wheel for positively controlling said bottles during movement from said first path to said pockets on said assembly wheel; second conveyor means for delivering a continuous supply of base cups along a second path toward said assembly wheel; second transfer means at the end of said second path driven by said drive means and indexable to a plurality of positions, said second transfer means including guide rail means for positively controlling said base cups; a glue applicator station aligned with one of said positions for applying glue to said base cups; third transfer means driven continuously in synchronization by said drive means for moving base cups from said second transfer means to said assembly wheel below said bottles so that said clamping means can be actuated to bring said bottles into engagement with said base cups; retractable stop means between said first conveyor means and said first transfer means; and sensor means associated with said second transfer means to actuate said retractable stop means in response to the presence of a base cup so that a bottle enters said transfer means only when a base cup is in synchronized position and moving toward said assembly wheel.

14. Apparatus for assembling base cups onto bottles, comprising a base having a rotating turret supported thereon; drive means on said base having a gear drive connected to said turret, said turret having a plurality of peripheral stations, each having a clamping means associated therewith; first conveyor means for delivering a continuous supply of base cups along a first path toward said turret; second conveyor means for delivering a continuous supply of bottles along a second path toward said turret; an adhesive-applying station on said base at an end of said first path, said adhesive-applying station including a rotatable carrier having a plurality of pockets for receiving base cups from said first path; indexing means driven by said drive means for intermittently rotating said carrier to align respective pockets with said first path to receive base cups therein, intermittently-actuated adhesive applicator means above said carrier, continuously-operated transfer means between said adhesive-supplying station and said turret for transferring base cups from said rotatable carrier to said turret; and continuously-operated bottle transfer means for transferring bottles from said first conveyor to said turret so that bottles are positively and continuously supplied in synchronized relation to said peirpheral stations for clamping by said clamping means to adhere said base cups and bottles; and discharge means for removing containers with applied base cups from said peripheral stations.

15. Apparatus as defined in claim 14, in which said adhesive-applying station includes a rotatable and vertically-reciprocable holder aligned with said pockets, means for rotating said holder and means for momentarily lifting said holder with a base cup thereon while adhesive is being applied.

16. Apparatus as defined in claim 14, in which said first conveyor means includes an apertured conduit having a pressurized fluid source in communication therewith and guide rail means associate therewith so that said fluid source moves said base cups along said first path.

17. Apparatus as defined in claim 14, in which said second conveyor means including a pair of spaced apertured conduits in communication with a pressurized fluid source, and plate means defining an elongated support slot between said conduits for receiving a portion of said bottle to suspend said bottles between said conduits.

18. Apparatus as defined in claim 17, in which said plate means is interrupted along a portion of said slot to define a gap with a deflectable member extending across said gap so that bottles can be manually inserted by deflecting said member.

19. Apparatus as defined in claim 14, further including first and second retractable stop means adjacent the ends of first and second paths and means for retracting said stop means so that a bottle enters said bottle transfer means provided a corresponding base cup exists in said rotatable carrier.

20. Apparatus as defined in claim 14, in which said bottle transfer means includes a starwheel rotatable on said base and an arcuate guide rail extending above said base and partially surrounding said starwheel so that bottles are frictionally gripped during transfer from said second path to said turret.

21. Apparatus as defined in claim 19, further including guide rail means on said base partially surrounding said turret between said second transfer means and said continuously-operated transfer means so that bottles are frictionally gripped in suspended positions in said peripheral stations and said base cups are moved under said bottles.

22. Apparatus as defined in claim 20, further including a dead plate positioned under said carrier and said continuously-operated transfer means between the end of said first path and said turret so that said cups are guided under positive control from said first path to said peripheral stations.

23. Apparatus as defined in claim 21, further including guide rails extending partially around said carrier and said continuously-operated transfer means so that base cups are frictionally gripped while being moved from said first path to said peripheral stations.

24. In an apparatus for assembling base cup means with container means having a neck and a neck ring comprising an endless assembly means, means for feeding base cup means to said assembly means and supply means for feeding said container means to said assembly means, said supply means including plate means defining an elongated slot for receiving said neck and suspending said container means by said neck ring, and means for moving said container means along said slot, said plate means including a container means feed gate comprising deflectable spring means defining part of said slot, said spring means being deflectable by said neck so that a container means can be inserted into said slot and suspended by said neck ring.

* * * * *